United States Patent [19]

Okonogi

[11] Patent Number: 5,778,349
[45] Date of Patent: Jul. 7, 1998

[54] METHOD OF PROCESSING INPUT/OUTPUT REQUEST IN COMPUTER SYSTEM INCLUDING A PLURALITY OF SUBSYSTEMS

[75] Inventor: Takahiro Okonogi, Tokyo, Japan

[73] Assignee: NEC Corporation, Tokyo, Japan

[21] Appl. No.: 564,554

[22] Filed: Nov. 29, 1995

[30] Foreign Application Priority Data

Nov. 30, 1994 [JP] Japan ................................ 6-321738

[51] Int. Cl.$^6$ ................................................ G06F 17/30
[52] U.S. Cl. ................... 707/1; 707/2; 707/10; 707/200; 707/202; 711/202; 711/206
[58] Field of Search .......................... 395/601, 602, 395/610, 616, 618; 707/1, 2, 10, 200, 202; 711/202, 206, 211

[56] References Cited

U.S. PATENT DOCUMENTS

| | | | |
|---|---|---|---|
| 5,065,311 | 11/1991 | Masai et al. | 364/200 |
| 5,278,978 | 1/1994 | Demers et al. | 395/600 |
| 5,317,568 | 5/1994 | Bixby et al. | 370/85.6 |
| 5,345,586 | 9/1994 | Hamala et al. | 395/650 |
| 5,416,917 | 5/1995 | Adair et al. | 395/500 |
| 5,522,066 | 5/1996 | Lu | 375/600 |

OTHER PUBLICATIONS

P.C. Patton; "IBM's Vesta Parallel File System"; Product/Technology Review, No. 151, Apr. 1994; pp. 1–5.

*Primary Examiner*—Thomas G. Black
*Assistant Examiner*—Donald Min
*Attorney, Agent, or Firm*—Whitham, Curtis & Whitham

[57] ABSTRACT

A computer system includes first and second subsystems. A device is coupled to the second subsystem. The first subsystem is provided with a function for processing a request to access the device. The first subsystem is also provided with information for translating a format of the request. The information is transferred from the first subsystem to the second subsystem. Occurrence of the request is detected in the second subsystem. The format of the request is transformed referring to the information in the second subsystem. Thereafter, the request is processed in the second subsystem to access the device. The information may include first information for translating the logical address into a real address and second information for translating the file offset into a block address.

20 Claims, 10 Drawing Sheets

METHOD OF PROCESSING INPUT/OUTPUT REQUEST IN COMPUTER SYSTEM INCLUDING A PLURALITY OF SUBSYSTEMS

BACKGROUND OF THE INVENTION

The present invention relates to a method of processing an input/output request in a computer system including a plurality of subsystems, and more particularly to a method of processing a request for accessing an external device connected to one of the subsystems.

In a computer system including a plurality of subsystems, a function of translating a format of an input/output request may be provided only in selected subsystems (e.g., only one subsystem). In such a case, when an input/output request occurs in one of the other subsystems, the subsystem requests the selected subsystem to translate the input/output request. This request must be performed even when the subsystem accesses a device (e.g., an external storage device) connected thereto.

This roundabout way of processing deteriorates efficiency of local input/output request processing to decrease system throughput.

SUMMARY OF THE INVENTION

In view of the aforementioned problem, one object of the present invention is to perform at least part of an input/output request processing only by the subsystem. Specifically, a format of the input/output request is translated by the subsystem.

Another object of the present invention is to designate files or file systems to be processed by a local input/output function. The "local input/output function" means an input/output request processing at least part of which is performed only by a subsystem.

According to the present invention, a method is performed in a computer system including first and second subsystems. The method is for processing a request to access a device coupled to the computer system.

According to the method, the first subsystem is provided with a function for processing a request to access the device. The first subsystem is also provided with information for translating a format of the request. The information is transferred from the first subsystem to the second subsystem. Occurrence of the request is detected in the second subsystem. The format of the request is transformed referring to the information in the second subsystem. Thereafter, the request is processed in the second subsystem to access the device.

The information may include first information for translating the logical address into a real address and second information for translating the a file offset into a block address.

BRIEF DESCRIPTION OF THE DRAWINGS

Other objects, features and advantages of the present invention will become more apparent when the following description is read in conjunction with the accompanying drawings, wherein.

In these drawings, the same reference numerals depict the same parts, respectively.

DETAILED DESCRIPTION OF THE PREFERRED EMBODIMENTS

Next will be described a first embodiment of the present invention.

Figure 1:
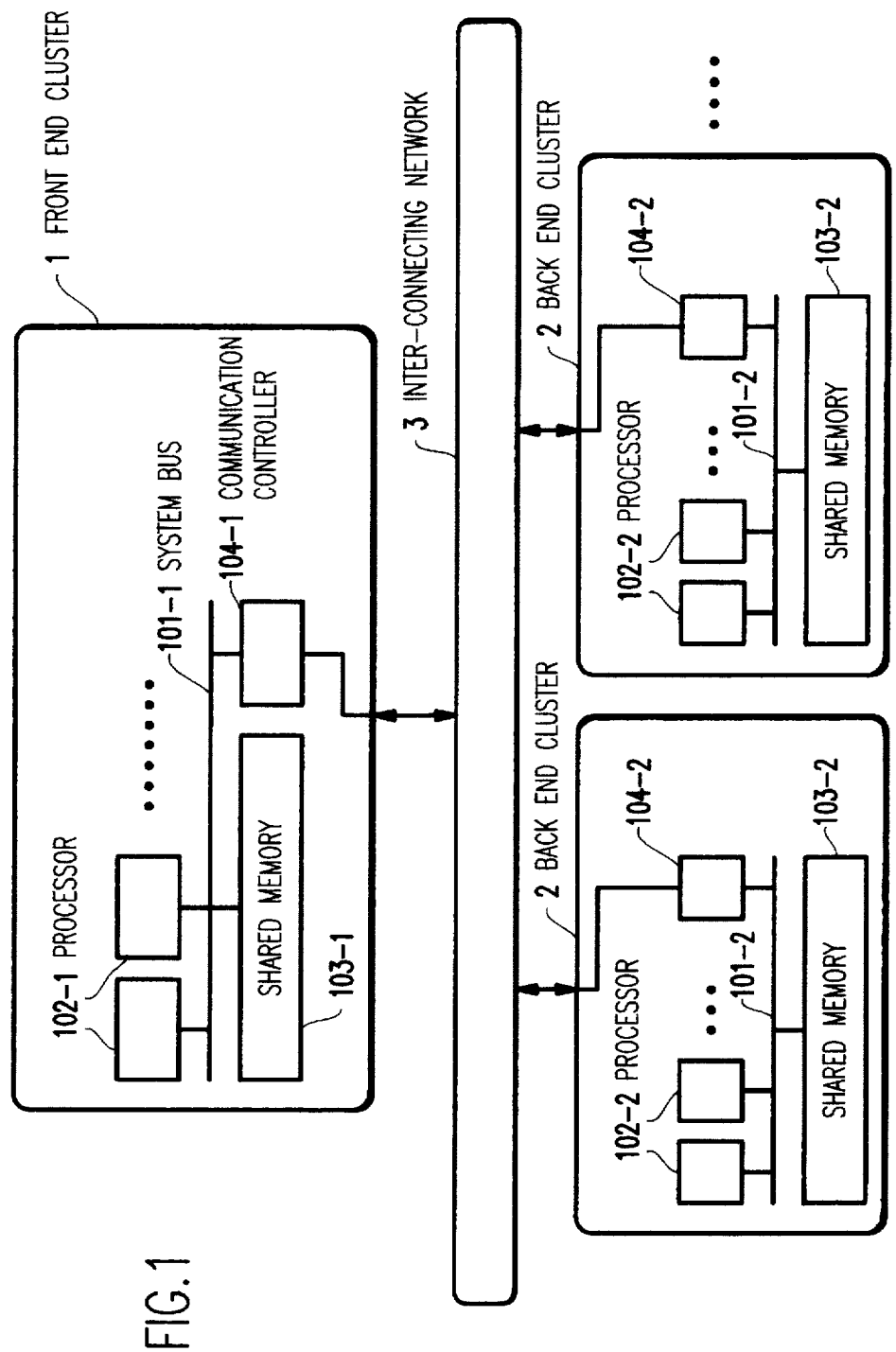
FIG. 1 is a block diagram showing a structure of a computer system according to a first embodiment of the present invention.

Referring to FIG. 1, a computer system according to the first embodiment of the present invention includes a front end cluster 1, back end clusters 2, and an inter-connecting network 3. The front end cluster 1 and the back end clusters 2 communicate with one another through the inter-connecting network 3.

In this exemplary computer system, only the front end cluster 1 has an operating system (OS) control function. The back end clusters 2 do not have the OS control function. When one of the back end clusters 2 uses the OS control function, the back end cluster 2 requests the front end cluster 1 to perform the OS control function.

The front end cluster 1 comprises a plurality of processors 102-1, a shared memory 103-1 accessed by the processors 102-1, a communication controller 104-1 for transmitting and receiving information to and from other clusters through the interconnecting network 3, and a system bus 101-1 for interconnecting these components.

The shared memory 103-1 stores OS codes and user program codes. Each processor 102-1 executes the OS codes and user program codes stored in shared memory 103-1.

The back end clusters 2 do not have the OS control functions. The computer system includes a plurality of back end clusters 2.

In this exemplary embodiment, the back end cluster 2 comprises a plurality of processors 102-2, a shared memory 103-2 accessed by the processors 102-2, a communication controller 104-2 for transmitting and receiving information to and from other clusters through the inter-connecting network 3, and a system bus 101-2 for interconnecting these components. The shared memory 103-2 stores information such as user program codes. Each processor 102-2 executes the user program codes stored in the shared memory 103-2.

Figure 2:
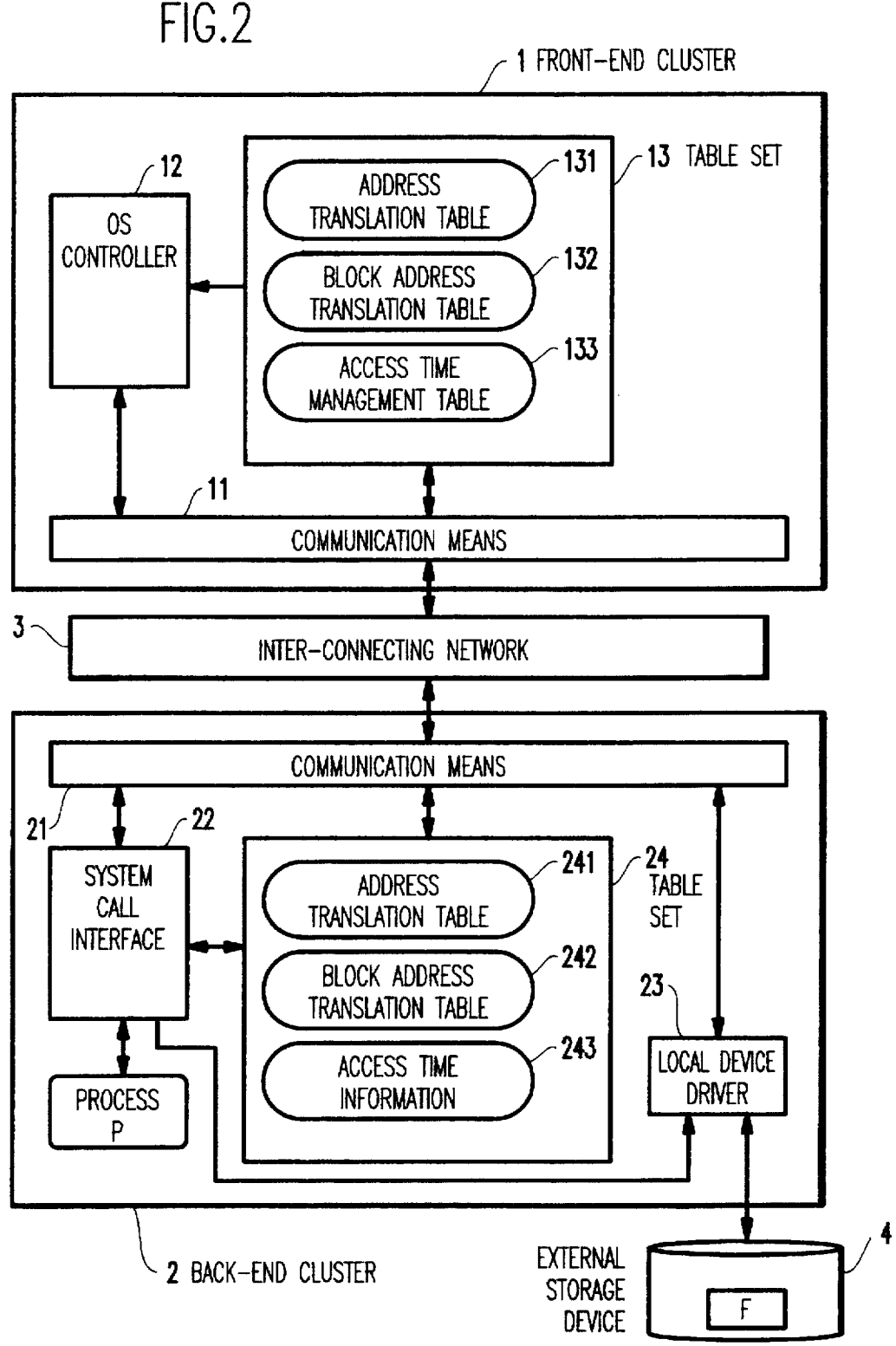
FIG. 2 is a functional block diagram showing functional structures of the first embodiment.

Referring to FIG. 2, the first embodiment is preferably implemented by software executed by the aforementioned hardware. The software forms a plurality of functional blocks as shown in FIG. 2.

The front end cluster 1 has a communication means 11 for transmitting and receiving information to and from other clusters through the inter-connecting network 3, an OS controller 12 for managing system call processing or the like, and a table set 13 containing various tables.

The table set 13 includes an address translation table 131, a block address translation table 132, and an access time management table 133. The address translation table 131 stores information for translating logical addresses used by the user program into real addresses (e.g., of the main memory). The block address translation table 132 stores information for translating file offsets into block numbers. The access time management table 133 stores information indicative of a history of accesses to the external storage device 4.

The back end cluster 2 has a communication means 21 for transmitting and receiving information to and from other clusters through the inter-connecting network 3, a system call interface 22 for managing receipt of a system call request which is issued from process P, a local device driver 23 for performing input/output processing to and from an external storage device 4 attached thereto, and a table set 24 containing various tables.

When the system call interface 22 receives a simple input/output request, which are described below, from the process P, the system call interface 22 services the input/output request by itself. Specifically, the system call interface 22 performs the translation of the addresses into real addresses and the translation of the file offsets into the block addresses, which are performed by the front end cluster 1 in the conventional system.

The process P is executed by one or more of the processors 102-2. The table set 24 of the back end cluster 2 includes an address translation table 241, a block address translation table 242, and an access time information 243, which are received from the front end cluster 1.

The system is designed so that the OS control function of the front end cluster 1 controls all functions such as execution or termination of a user program executed by the front end cluster 1 or the back end cluster 2. The OS control function of the front end cluster 1 also assigns memory spaces.

Next is described the operation of the computer system according to the first embodiment.

Figure 3:
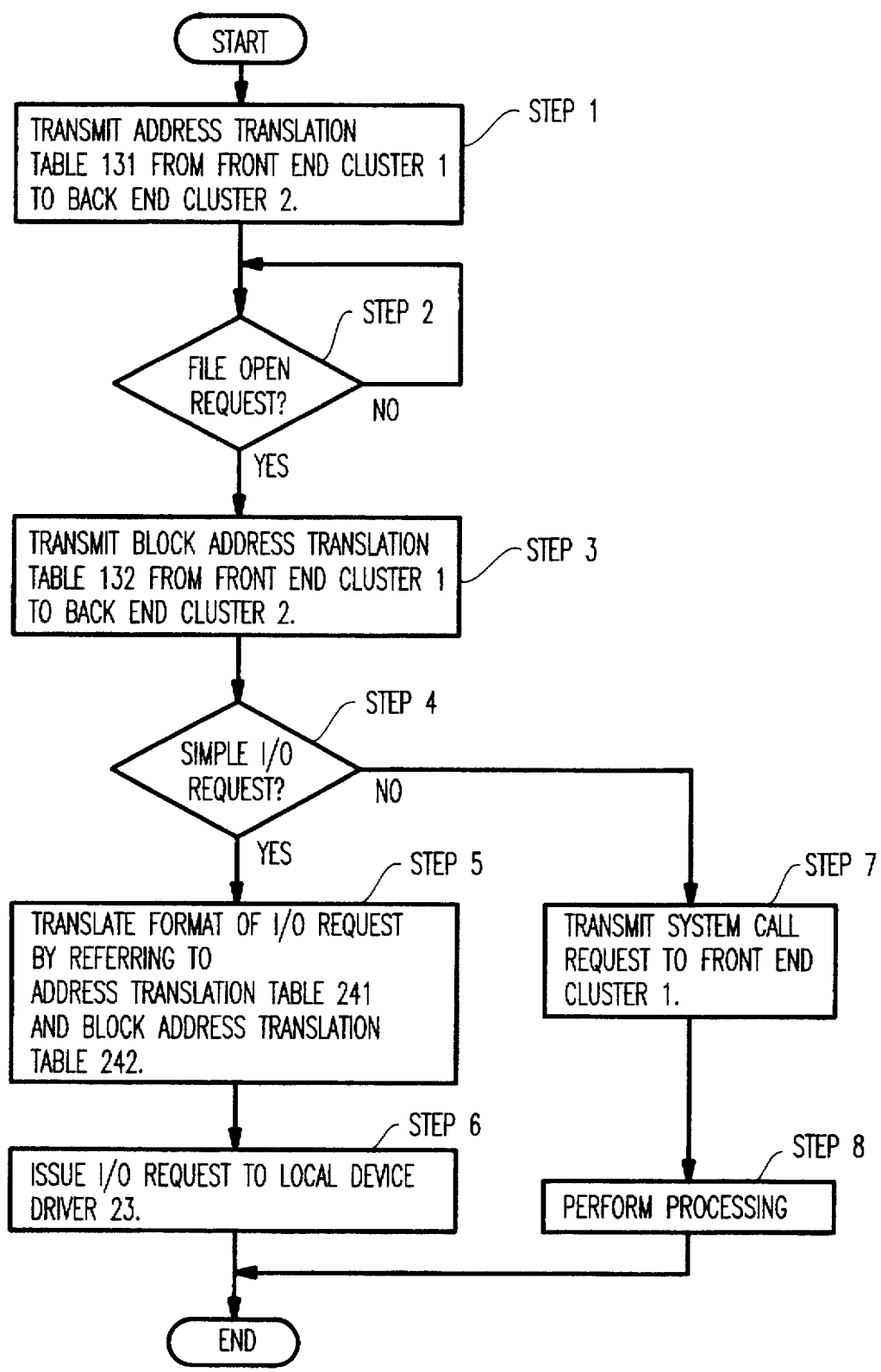
FIG. 3 is a flowchart illustrating operations of the first embodiment.
Figure 4:
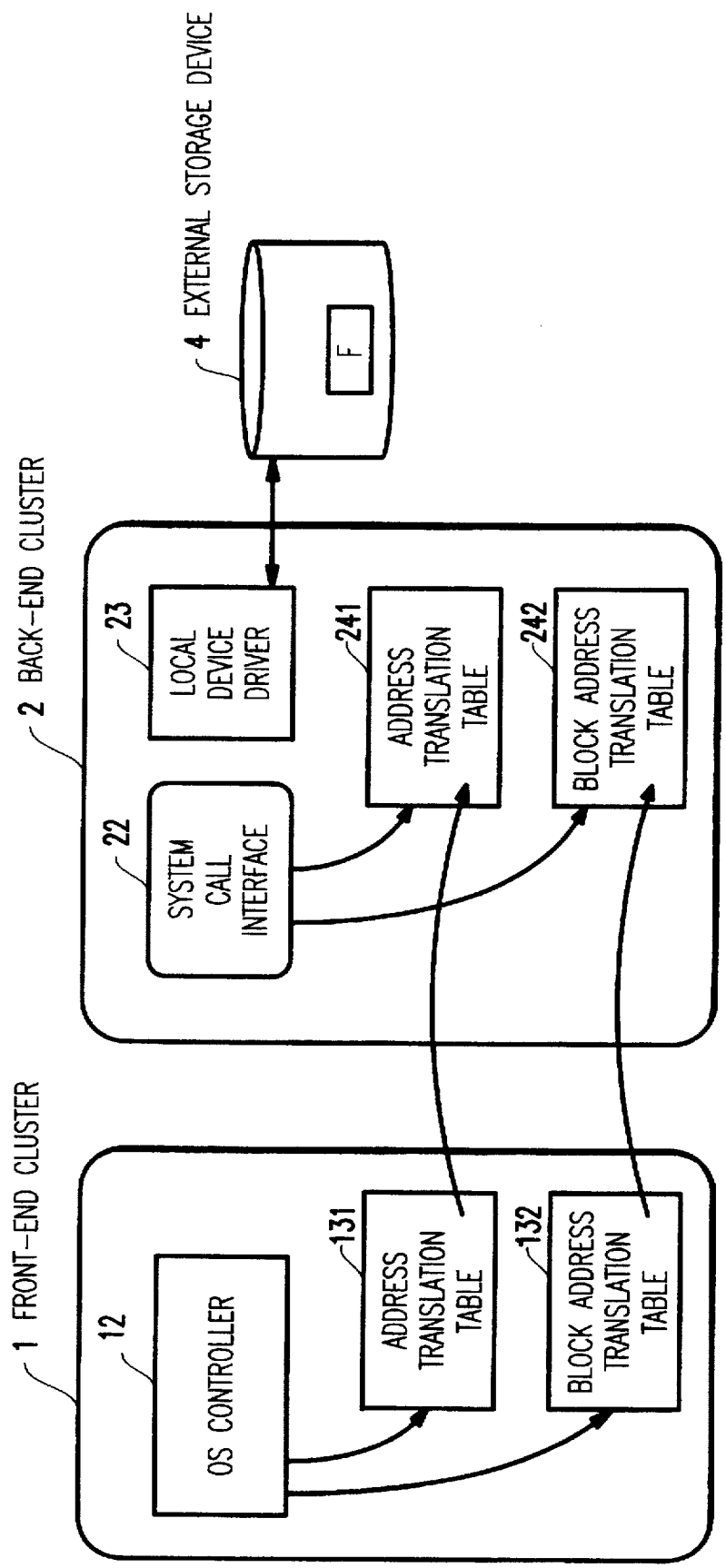
FIG. 4 illustrates steps of an address translation operation of the first embodiment.

Referring to FIG. 3, in step 1, when a user program is activated in the back end cluster 2, the OS controller 12 of the front end cluster 1 transmits an address translation table 131 to the back end cluster 2 through the inter-connecting network 3 by using the communication means 11. The address translation table 131 includes mapping information for translating memory addresses (e.g., logical addresses) used by the user program to actual addresses (real addresses) of the main memory. The address translation table 131 is received by the communication means 21 of the back end cluster 2 and stored in the table set 24 as an address translation table 241. The user program is activated as process P on the back end cluster 2.

In step 2, when process P issues a system call request for opening file F in the external storage device 4, the system call interface 22 sends this request to the OS controller 12 of the front end cluster 1 and branches to step 3.

In step 3, the OS controller 12 of the front end cluster 1 performs the "file open" process, and sends the block address translation table 132 to the back end cluster 2 as a part of the result of the file open process. The block address translation table 132 stores information necessary for translation of file offsets into block numbers. The block address translation table 132 is received by the back end cluster 2 through the inter-connecting network 3, the communication means 11 and 21.

Upon receiving the block address translation table 132, the system call interface 22 stores the block address translation table 132 in the table set 24 as a block address translation table 242.

In step 4, when the system call interface 22 receives another system call request, the system call interface 22 determines, based on the type of received system call request, whether or not the request is a "simple input/output request" for a local file. Here, the "simple input/output request" means input/output requests not requiring changes in file size, expansion or deletion of a file, or exclusive record control. If the system call interface 22 receives a simple input/output request, the system call interface 22 branches to step 5. Otherwise, the system call interface 22 branches to step 7.

In step 5, when process P requests a simple input/output request, the system call interface 22 translates the format of the input/output request by referring to the address translation table 241 and the block address translation table 242.

In this exemplary embodiment, it is assumed that the process P requested the reading of data out of file F in the external storage device 4 and the storage of the data into the shared memory 103-2. The addresses of the data in file F and in the shared memory 103-2 are designated by a file offset and a logical address. For example, the file offset is 1024 bytes and file F stores the data at locations 1024 bytes after the beginning thereof. The data has a length of 512 bytes. The shared memory stores the data at locations beginning from a logical address α.

The system call interface 22 translates the logical address α to a real address β by referring to the address translation table 241. The system call interface 22 calculates the block address designated by the file offset of 512 bytes by referring to the block address translation table 242. In this case, it is assumed that the block address is 128. Thus, the input/output request is translated into a format using the real address and the block address.

In step 6, the system call interface 22 issues an input/output request to the local device driver 23 in the format translated in step 5. In this case, the system call interface 22 requests the local driver to read 512 bytes out of the 128th block of the external storage device 4 and to store the data read into the shared memory 103-2 at locations beginning from a real address of β.

The local device driver 23 accesses the external storage device 4 according to the input/output request, and informs the system call interface 22 of the result of processing. The system call interface 22 in turns informs the process P of the processing result.

In step 7, when the system call interface 22 receives a system call that is not a "simple input/output request", the system call interface 22 processes this request in cooperation with the front end cluster 1.

For example, it is assumed that the process P issues an input/output request involving expansion of file F, which requires appending data to the end of file F. It is necessary to assign a new region (block) on the external storage device 4 for the file F. Because such processing is implemented by using the "file management function" of the OS, the system call interface 22 transmits the received system call request to the front end cluster 1.

Upon receiving this request, the OS controller 12 directly controls (via communication means 11, inter connecting network 3 and communication means 21) the local device driver 23 to expand the region of file F by using an automatic file expansion function. The file expansion function is one of the file management functions of the OS (e.g., UNIX). Thereafter, the OS controller 12 sends an input/output request for writing data in the expanded region to the local device driver 23.

Upon receiving this request, the local device driver 23 writes the data into the designated region. Then, the local device driver 23 posts the processing result to the OS controller 12.

The OS controller 12 in turn posts the processing result to the system call interface 22 which posts the processing result to the process P.

Next is described the access time management feature of the first embodiment.

Figure 5:
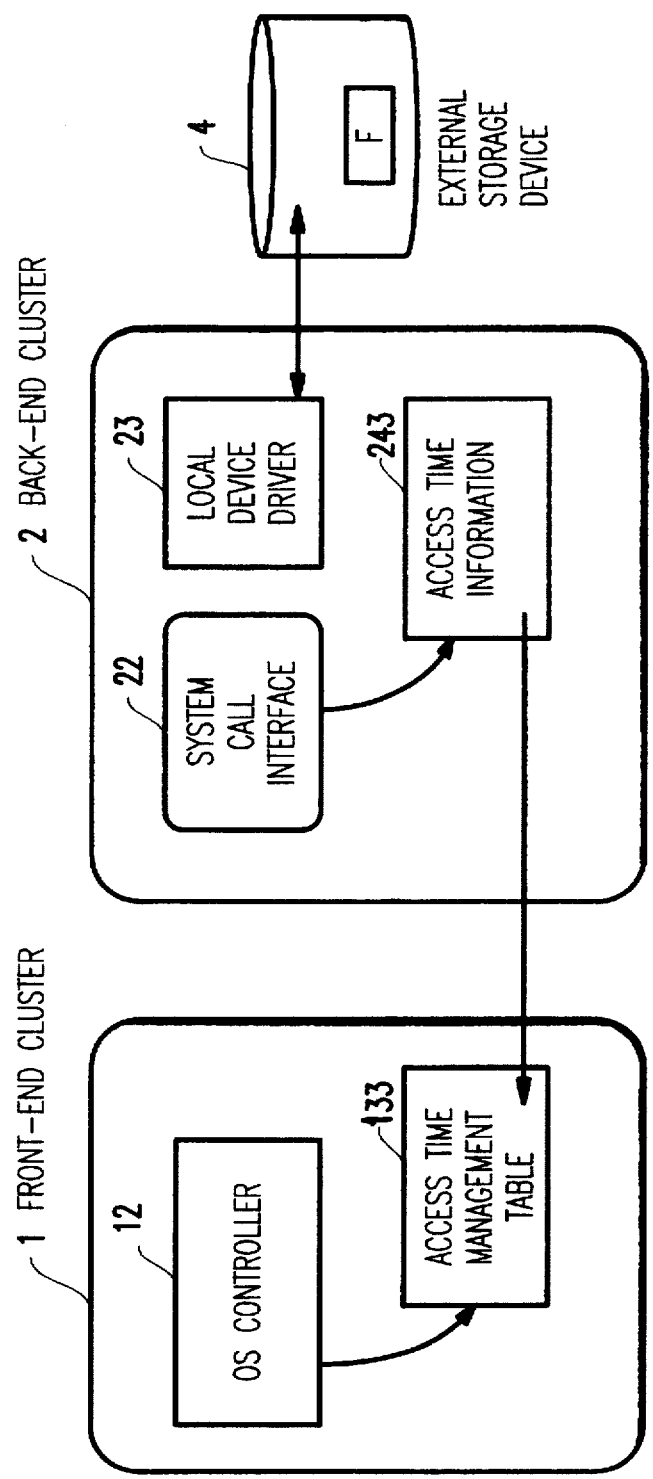
FIG. 5 illustrates steps of an access time recording operation of the first embodiment.

Referring to FIG. 5, when a simple input/output is performed for the file F on the external storage device 4, the system call interface 22 records the latest access time in an access time information 243 in the table set 24. The system call interface 22 posts the latest access time to the front end cluster 1 when the file F is closed.

Specifically, when process P requests a system call to close the file F, the system call interface 22 transmits the system call request to the front end cluster 1 along with the latest access time of file F. This process is performed in step 7 of FIG. 3.

The OS controller 12 of the front end cluster 1 also records the latest access time in an access time management table 133 when it updates the file F or the like. Then, when the OS controller 12 receives a file close request from the system call interface 22, the OS controller 12 updates the access time management table 133 based on the access time information 243.

Specifically, if the latest access time of the access time management table 133 is older than (e.g. before) the latest access time of the access time information 243, then the latest access time in the access time management table 133 is replaced with the latest access time of the access time information 243. The latest access time includes a reference latest access time and an updated latest access time, and they are managed independently by OS controller 12.

Thus, some of the system requests (e.g., simple input/output requests) are processed without using the front end cluster 1. Nevertheless, the front end cluster 1 stores the latest access time in the access time management table 133.

The "access time management" refers to accurately recording information such as "when a file was last rewritten," or "when a file was last referred to" for each file. The access time management allows, for example, backing up only files which were rewritten within the last week, deleting files which were not accessed for more than a year, or monitoring unauthorized access.

In the present invention, a simple input/output request is independently processed in the back end cluster 2 in the present invention. The front end cluster 1 is not informed of the access time when the simple input/output request is processed only by the back end cluster 2. Then, as stated above, in the first embodiment, the access time information 243 is recorded in the back end cluster 2, and the front end cluster 1 updates the latest access time therein referring to the access time information 243 so that the front end cluster 1 always stores the exact latest access time.

Next are described modifications of the first embodiment. In the first embodiment, the block address translation table 132 and the result of processing of a file open request may be transmitted separately. The access time information 243 also may be sent to the front end cluster 1 separately from the file close request.

As described, in this embodiment, upon starting (e.g., "initialization") of the user program in the back end cluster 2, the address translation table 131 is transferred to the back end cluster 2. Upon receiving a request to open a file from the user program, the block address translation table 132 is transferred to the back end cluster 2. Therefore, the back end cluster 2 can process a simple input/output request by itself without intervention by the front end cluster 1 (hereinafter, "local input/output function"). Thus, system throughput and efficiency are increased and a load on the front end cluster 1 is reduced as compared to the conventional systems.

Next is described a second embodiment of the present invention. In the first embodiment, all the simple input/output requests are processed by the local input/output function. The method according to the first embodiment reduces the load on the front end cluster 1 and improves the efficiency in processing simple input/output requests. However, in the first embodiment, the front end cluster cannot monitor the load on the external storage device 4 because simple input/output requests are processed without using the front end cluster 1.

However, sometimes, it is desirable for the front end cluster 1 to monitor the input/output load on the external storage device. The second embodiment is for designating simple input/output requests which are to be processed by using the local input/output function. This designation can be processed on a "file system" basis. Here, a "file system" means a set of files and data containing information managing the files.

Figure 6:
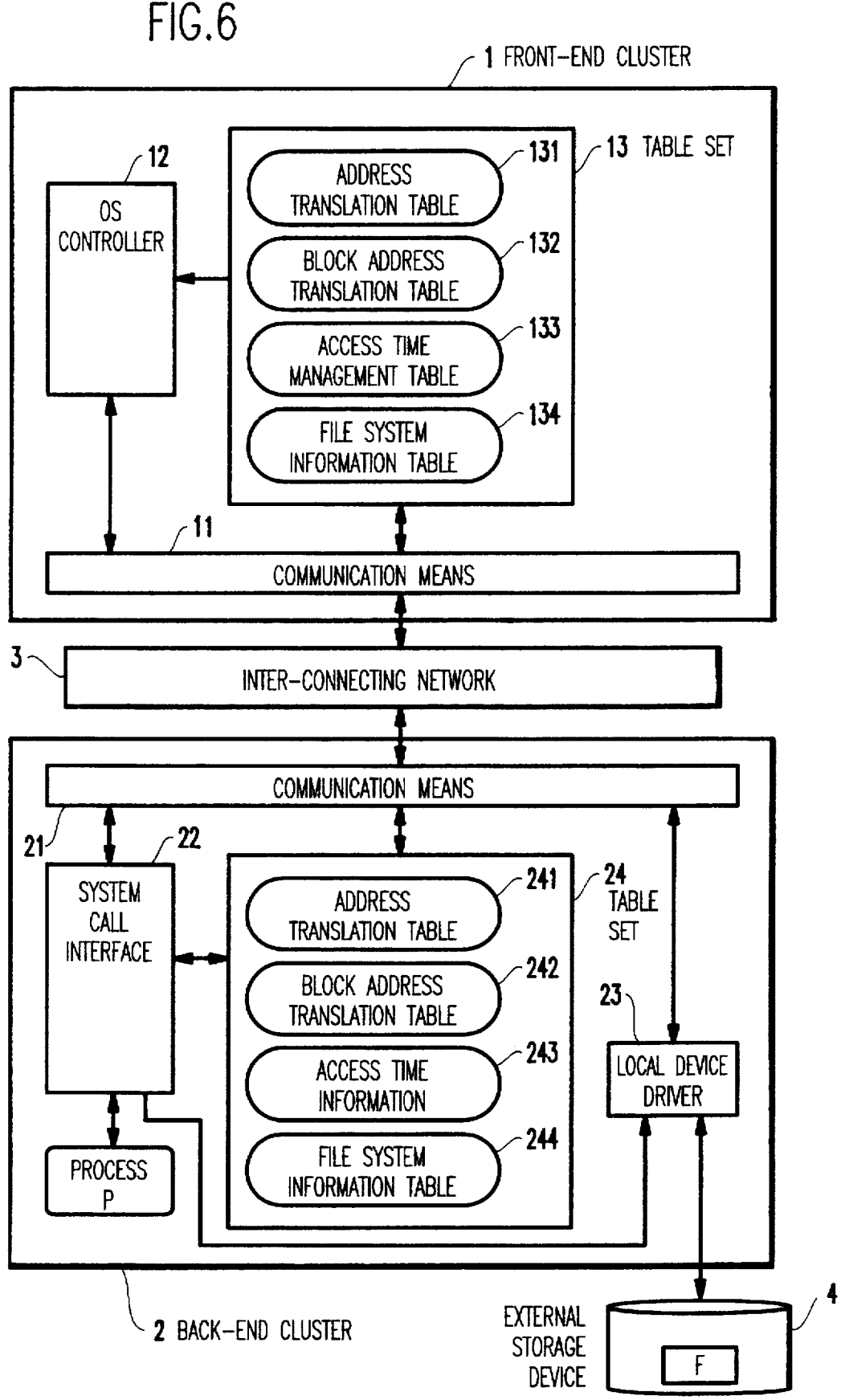
FIG. 6 is a functional block diagram showing functional structures of a second embodiment of the present invention.

Referring to FIG. 6, the second embodiment includes file system information tables 134 and 244 in addition to the structures of the first embodiment. The file system information table 134 in the front end cluster 1 is provided for each file system and describes whether or not files contained in the corresponding file system are processed by the local input/output function. The file system information table 134 is loaded from the external storage device 4 to the shared memory 103-1 of the front end cluster 1 when the file system is opened. The file system information is held in the shared memory until the file system is closed. The file system information table 134 is transferred to the back end cluster 2 and stored as the system information table 244.

Next is described the operation of the second embodiment.

Figure 7:
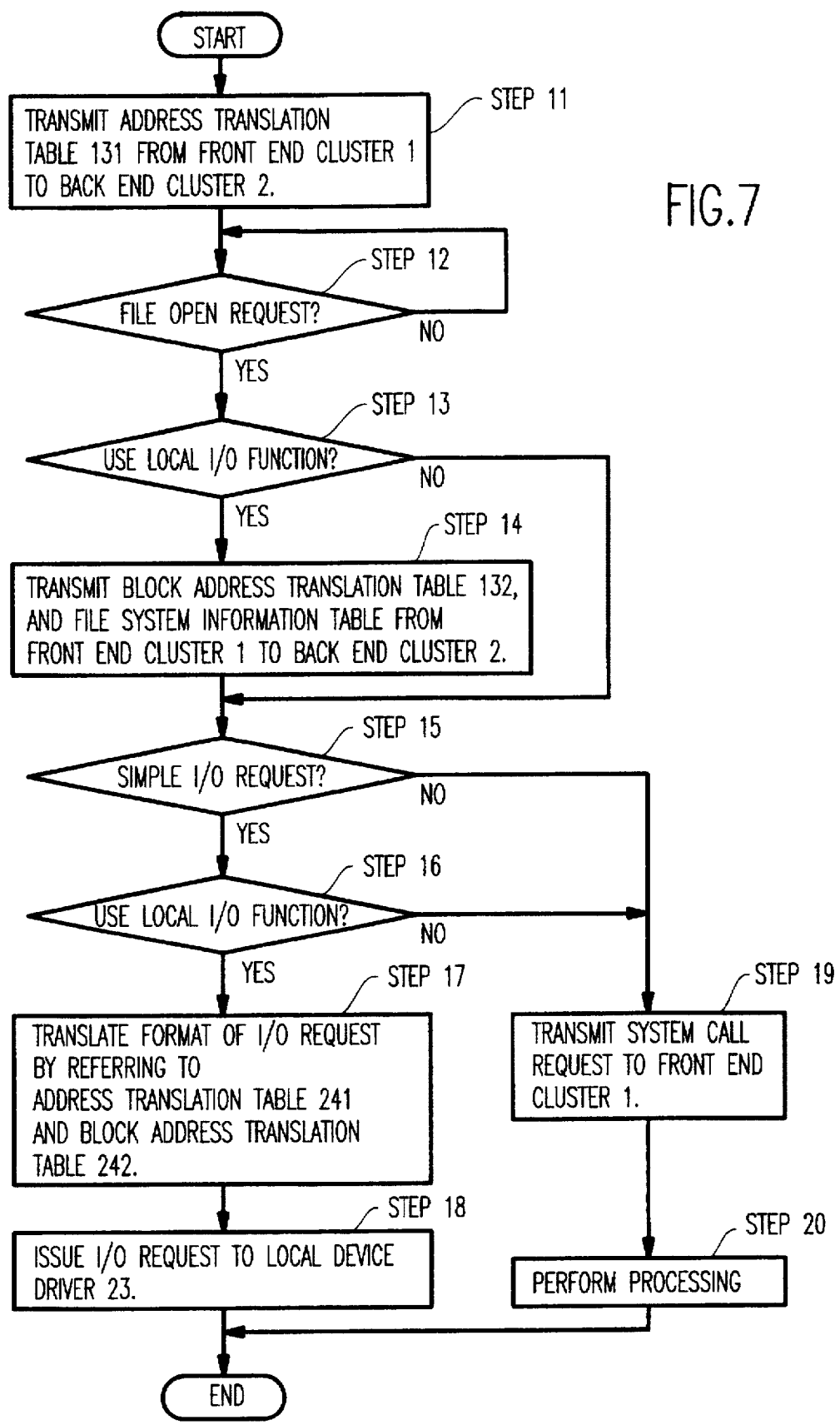
FIG. 7 is a flowchart illustrating operations of the second embodiment.

Referring to FIG. 7, in step 11, similarly to step 1 of the first embodiment, when a user program is activated for its execution as process P in the back end cluster 2, the address translation table 131 is transmitted to the back end cluster 2 and stored therein as the address translation table 241.

In step 12, when the process P issues a "system call" request to open a file F in the external storage device 4, the system call interface 22 sends the request to the OS controller 12. The OS controller 12 performs "file open" processing. Thereafter, the system call interface 22 branches to step 13.

In step 13, the OS controller 12 determines whether file F is a member of a file system which is to be processed by the local input/output function. This determination is performed by referring to the file system information table 134.

When file F is to be processed by the local input/output function, the system call interface 22 branches to step 14. Otherwise, the OS controller 12 transmits the file system information table 134 to the system call interface 22 and branches to step 15. Upon receiving the file system information table 134, the system call interface 22 stores the file system information table 134 into the shared memory 102-2 as the file system information 244.

In step 14, the OS controller 12 transmits, via communication means 11, interconnecting network 3 and communication means 21, the block address translation table 132 and the file system information table 134 to the system call interface 22. The system call interface 22 stores the block address translation table 132 and the file system information table 244 into the shared memory 102-2 as the block address translation table 242 and the file system information table 244, respectively.

In step 15, when process P issues a system call request, the system call interface 22 determines whether or not the system call request is a simple input/output request. When the request is a simple input/output request, the system call interface 22 branches to step 16. In this case, it is assumed that the process P issued a simple input/output request for file F.

In step 16, the system call interface 22 determines whether or not file F belongs to a file system which is to be processed by the local input/output function. This determination is performed by referring to the file system information table 244. If file F is to be processed by the local input/output function, the system call interface 22 branches to step 17. Otherwise, the system call interface 22 branches to step 19.

In step 17, similarly to step 5 of the first embodiment, the system call interface 22 translates the format of the input/output request by referencing the address translation table 241 and the block address translation table 242. Thereafter, as in step 6 of the first embodiment, the system call interface 22 sends the translated input/output request to the local device driver 23. The local device driver 23 accesses the external storage device 4 according to the input/output request.

In step 19, as in step 7 of the first embodiment, the system call interface 22 transmits the system call request to the front end cluster 1. In step 20, as in step 8 of the first embodiment, the system call interface 22 performs processing according to the instruction issued by the OS controller 12 of the front end cluster 1.

Next is described a third embodiment of the present invention. The feature of the third embodiment is holding a file information table 245 for each file in the external storage device. The file information table 245 indicates whether the file is to be processed by the local input/output function. The file information table 245 corresponds to the file system information table 244 of the second embodiment. However, it is provided on a "file" basis rather than on a "file system" basis. The file information table 245 is stored in the file attribute information of each file.

Figure 8:
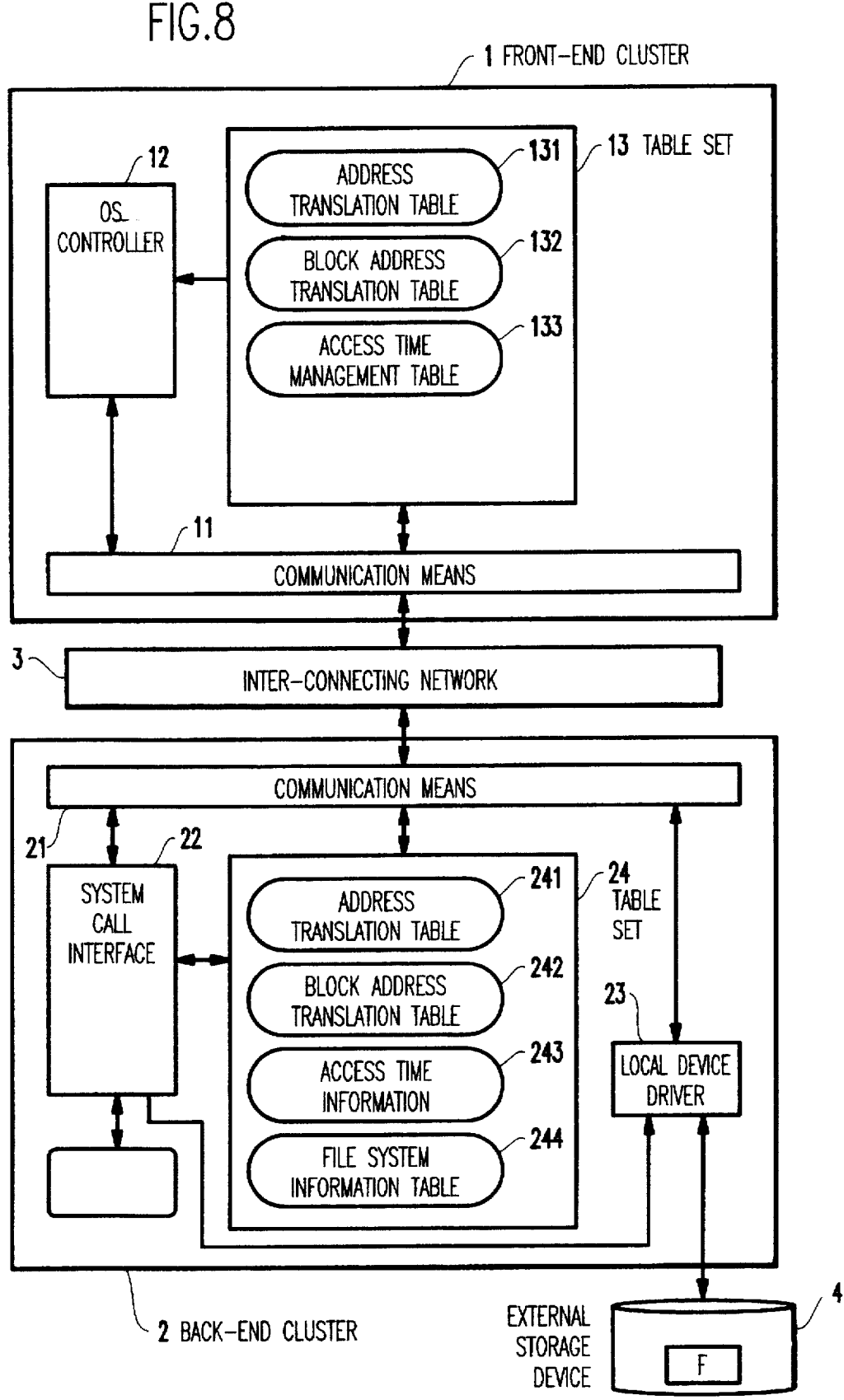
FIG. 8 is a functional block diagram showing functional structures of a third embodiment of the present invention.

Referring to FIG. 8, the third embodiment includes a file information table 245 in addition to the structures of the first embodiment.

The third embodiment performs substantially the same steps as the second embodiment depicted in FIG. 7. The file information table 245 is handled in substantially the same way as the file system information table 244 of the second embodiment.

In step 13, the OS controller 12 obtains the file information table 245 of the file to be processed from the attribute information of the file stored in the external storage device 4.

In steps 13 and 16, the system call interface 22 determines whether or not the file is to be processed by the local input/output function referring to the file information table 245.

According to the third embodiment, the file information table 245 is provided for each file and stored in the attribute information of the file. When the file is moved or copied, the file information table 245 accompanies the file moved or copied. This configuration allows designating whether the local input/output function is to be used even if a file is copied or moved from one file system to another.

Next is described a fourth embodiment of the present invention. A feature of the fourth embodiment is a local fault handling means 24 that handles a failure occurring in the external storage device 4, without cooperation with or intervention by the front end cluster 1.

Figure 9:
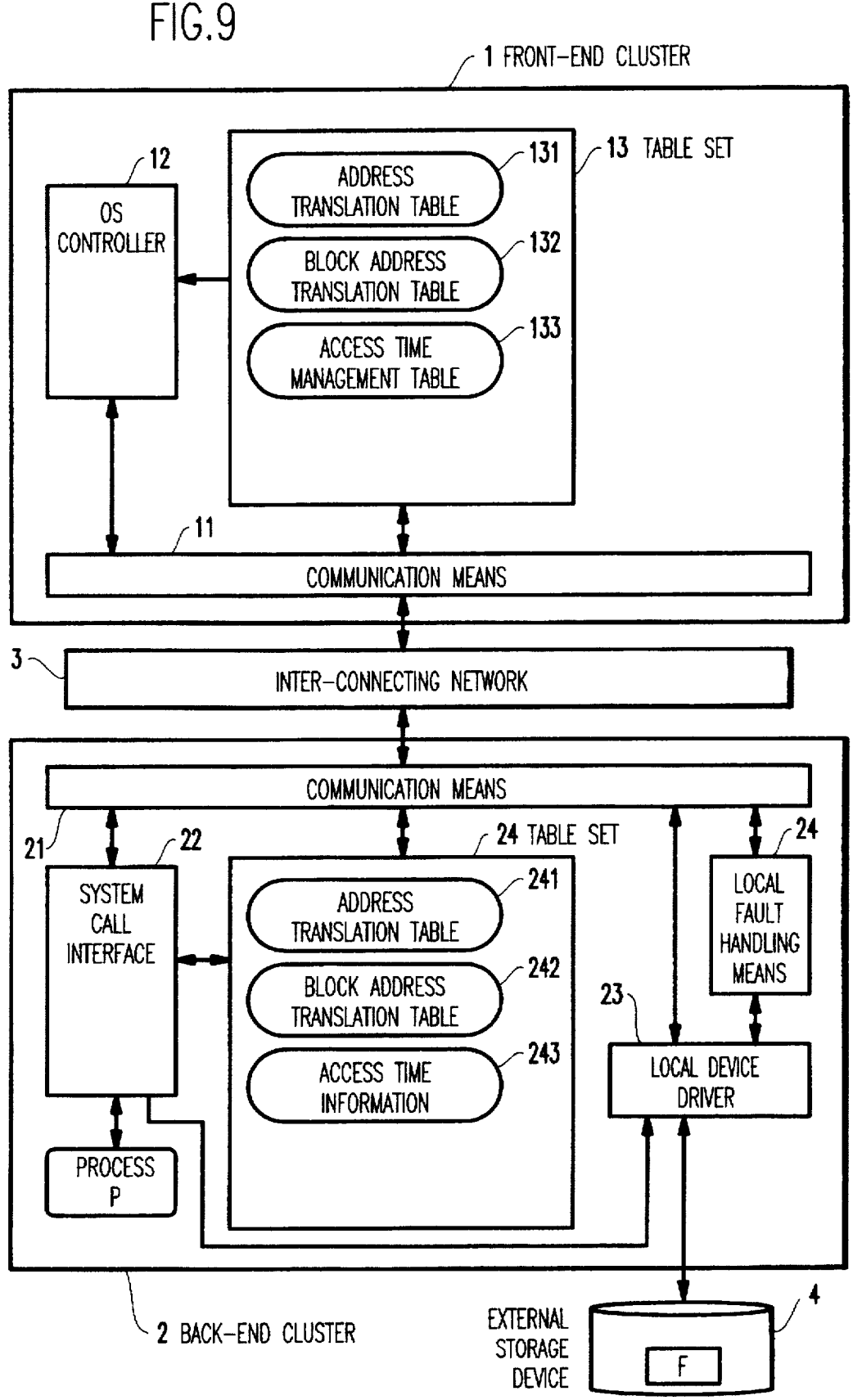
FIG. 9 is a functional block diagram showing functional structures of a fourth embodiment of the present invention.

Referring to FIG. 9, the fourth embodiment includes the local fault handling means 24 in addition to the structures of the first embodiment. The local fault handling means 24 handles a failure occurring in the external storage device 4 attached to the back end cluster 2.

When a failure occurs in the external storage device 4, it is detected by the local device driver 23 and informs the local fault handling means 24 accordingly. The local fault handling means 24 determines an action required for handling the failure by itself and without intervention by the front end cluster 1, and performs a necessary failure recovery procedure.

For example, when the local device driver 23 informs the local fault handling means 24 that all inputs/outputs for the external storage device 4 have been abnormally terminated due to hardware failure in the control mechanism of the external storage device 4, the local fault handling means 24 determines by itself that the external storage device 4 is unavailable. Thereafter, the local fault handling means 24 shuts down the external storage device 4 by informing the OS controller 12 of the front end cluster 1 (through the communication means 21 and the interconnecting network 3) of the hardware failure of the external storage device.

Next is described a fifth embodiment of the present invention. A feature of the fifth embodiment is a combination of a fault handling server 14 and local fault handling means 25.

Figure 10:
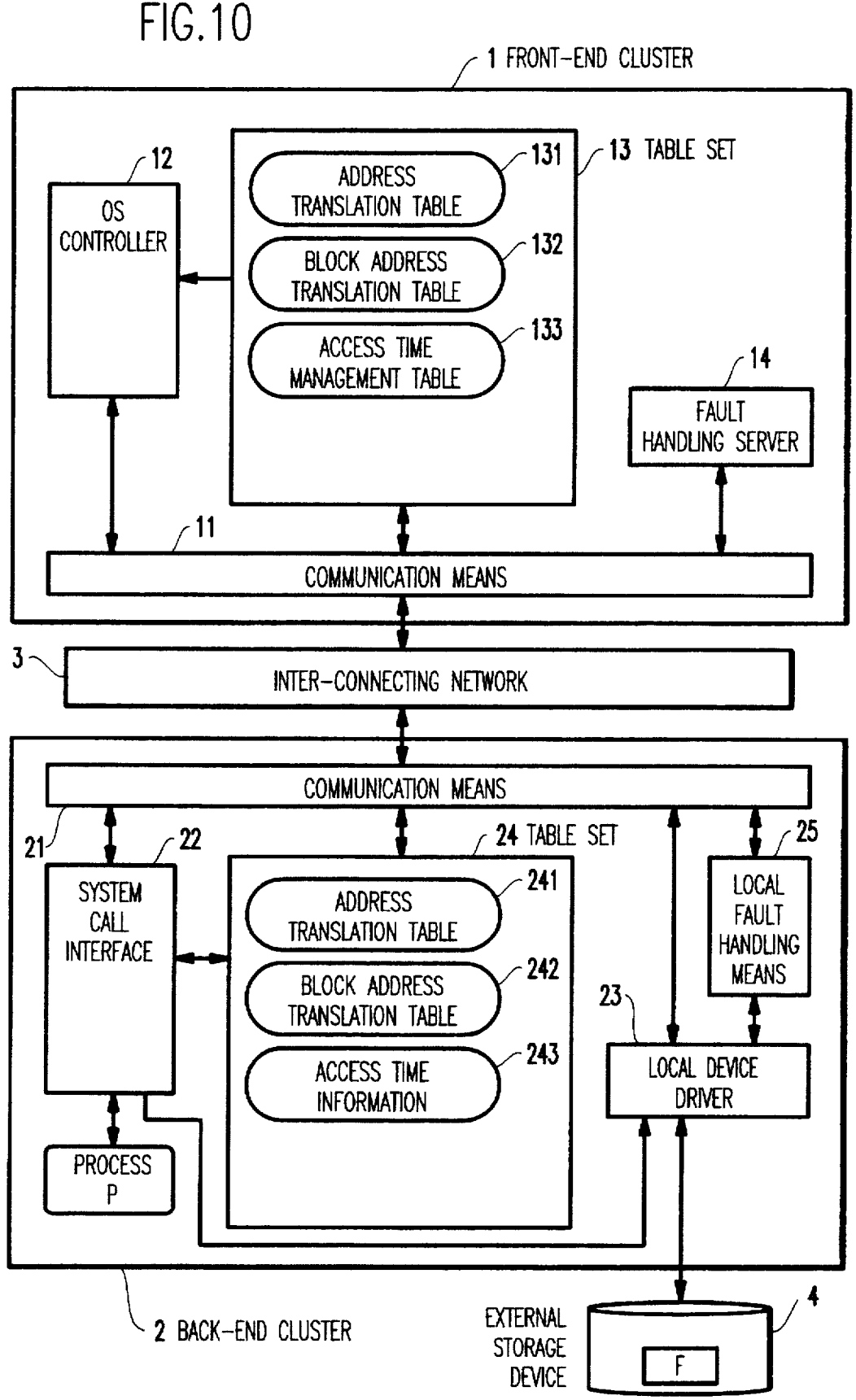
FIG. 10 is a functional block diagram showing functional structures of a fifth embodiment of the present invention.

Referring to FIG. 10, the fifth embodiment includes the fault handling server 14 and local fault handling means 25 in addition to the structures of the first embodiment. The fault handling server 14 and the local fault handling means 25 are provided in the front end cluster 1 and the back end cluster 2, respectively.

In the fifth embodiment, when a failure occurs in the external storage device 4, the local device driver 23 informs the fault handling server 14 in the front end cluster 1, through the communication means 21 and the interconnecting network 3, of the failure. Upon receiving this information, the fault handling server 14 begins necessary fault handling procedures.

For example, when the local device driver 23 informs the fault handling server 14 that all inputs/outputs are abnormally terminated due to hardware failure of the external storage device 4, the fault handling server 14 determines that the external storage device 4 is unavailable. The fault handling server 14 instructs the local fault handling means 25 to shut down the external storage device 4. This instruction is transmitted through the communication means 11, inter-connecting network 3, and communication means 21. Upon receiving the instruction, the local fault handling means 25 shuts down the external storage device 4.

Thus, the fifth embodiment performs fault handling in a server-client scheme so that the front end cluster 1 can manage handling of failure occurring in any back end cluster 2.

As stated above, in the present invention, a local input/output request issued from a process in the back end cluster 2 can be processed effectively because a simple input/output request can be processed solely in the back end cluster without using the front end cluster. Additionally, the throughput of the entire system is also improved.

Some of the input/output requests are processed without informing the front end cluster. Nevertheless, the front end cluster 1 can store and manage the access time information because the access time management table 133 in the front end cluster I is updated by referring to the access time information 243 in the back end cluster 2.

The use of the local input/output function is programmable on a "file system" basis or on a "file" basis because the system stores the file system information table 244 or the file information table 245, respectively.

If a file is moved or copied from one file system to another, the file information table 245 accompanies the file moved or copied because the file information table 245 is stored in the attribute information of the file.

Failure of the external storage device 4 can be handled in the back end cluster 2 in a closed manner (e.g., solely by the back end cluster 2), as well as can be collectively handled by the front end cluster in a client-server scheme so that a fault handling method meeting the mode of operation by a user can be employed.

The present embodiments are therefore, to be considered in all respects as illustrative and not restrictive, the scope of the invention being indicated by the appended claims rather than by the foregoing description and all changes which come within the meanings and range of equivalency of the claims are therefore intended to the embraced therein.

What is claimed is:

1. A computer system for processing an access request by accessing a device, said computer system comprising:

a first subsystem and a second subsystem, said first subsystem including:
means for storing information for translating an address included in said request;
means for translating said address by referring to said information;
means for updating said information in accordance with said request sent from said second subsystem; and
means for sending to said second subsystem a modified request formed by replacing said address in said request with the translated address, and said second subsystem including:
means for storing said information transferred from said first subsystem;
means for determining whether a request having occurred in said second subsystem requires the use of said means for translating in said first subsystem;
means for translating an address included in said request when said means for determining determines that said request does not require the use of said means for translating in said first subsystem; and
means for sending said request to said first subsystem when said means for determining determines said request requires the use of said means for translating in said first subsystem.

2. A method of processing an access request for accessing a device coupled to a computer system, said computer system comprising a first subsystem having information for translating an address included in said request and a function for changing said information, and a second subsystem being connected to said device, said method comprising the steps of:

(1) transferring said information from said first subsystem to said second subsystem;
(2) detecting the occurrence of said request in said second subsystem;
(3) determining in said second subsystem whether said address included in said request detected in step (2) can be translated by referring to said information transferred from said first subsystem in step (1);
(4) when step (3) determines that said address in said request can be translated, translating said address by referring to said information in said second subsystem;
(5) when step (3) determines that said address in said request cannot be translated by referring to said information in said second subsystem, sending said request from said second subsystem to said first subsystem, updating said information is said first subsystem in accordance with said request sent from said second subsystem, translating said address by referring to the updated information in said first subsystem, and sending from said first subsystem back to said second subsystem a modified request formed by replacing said address in said request with the translated address; and
(6) processing said modified request in said second subsystem to access said device.

3. A method according to claim 2, wherein said step (2) includes steps of:

(2-1) determining whether said request can be processed without using said function in said first subsystem; and
(2-2) processing said request using said function in said first subsystem when said step (2-1) determines that said request requires using said function in said first subsystem.

4. A method according to claim 3, wherein said device includes a storage device for storing a file, and wherein said step (2-1) includes a step of:

(2-1-1) determining whether processing of said request accompanies at least one of a change in size of said file, expansion of said file, deletion of said file, and exclusive record control of said file.

5. A method according to claim 2, wherein said request includes a logical address, and wherein said information comprises first information for translating a logical address into a real address in said first subsystem.

said step (1) including a step of:
(1-1) transferring said first information from said first subsystem to said second subsystem, and
said step (4) including a step of:
(4-1) translating said logical address into a real address in said second subsystem.

6. A method according to claim 2, wherein said device includes a storage device for storing a file, said request includes a file offset indicating a location in said file, and wherein said information comprises second information for translating a file offset into a block address of said storage device,
said step (1) including a step of:
(1-2) transferring said second information from said first subsystem to said second subsystem, and
said step (4) including a step of:
(4-2) translating said file offset into a block address in said second subsystem.

7. A method according to claim 2, wherein said device includes a storage device for storing a file, said request includes a file offset indicating a location in said file and a logical address, wherein said
first subsystem includes first information for translating said logical address into a real address and second information for translating said file offset into a block address.

said step (1) including a step of:
(1-3) transferring said first and second information from said first subsystem to said second subsystem, and said step (4) including a step of:
(4-3) translating said logical address into a real address, and translating said file offset into a block address in said second subsystem.

8. A method according to claim 2, wherein said first subsystem stores first access information indicative of access time of said device, and wherein said step (6) includes steps of:
(6-1) storing second access information indicative of access time of said device in said second subsystem; and
(6-2) updating said first access information according to said second access information.

9. A method according to claim 2, wherein said device includes a storage device for storing files, further comprising step of:
storing third information indicating which one or ones of said files are to be subjected to said steps (4) and (5);
wherein said step (2) includes a step of:
(2-3) determining whether said request requests an operation for a file to be subjected to said steps (4) and (5) by referring to said third information; and
(2-3) processing said request using said function in said first subsystem when said step (2-3) determines that said request is not to be subjected to said steps (4) and (5).

10. A method according to claim 9, further comprising a step of:
storing said third information for each file system.

11. A method according to claim 10, further comprising a step of:
storing said third information for each file.

12. A method according to claim 11, further comprising a step of:
storing said third information in attribute information of corresponding ones of said files.

13. A method according to claim 2, wherein
said second subsystem includes fault handling means,
and wherein said method further comprises a step of:
(7-1) handling a failure of said device by said fault handling means in said second subsystem.

14. A method according to claim 2, wherein step of:
said first subsystem includes a fault handling server, and said second subsystem includes fault handling means,
and wherein said method further comprises a step of:
(7-2) handling a failure of said device with said fault handling server and said fault handling means.

15. A method according to claim 2, wherein said step (5) is performed without intervention by said first subsystem.

16. A method according to claim 2, further comprising a step of monitoring, by said first subsystem, an input/output load on said device.

17. A method according to claim 2, wherein said device includes at least one file stored therein, said method further comprising a step of holding a respective file information table for each file of said at least one file.

18. A method according to claim 17, wherein said file information table indicates whether said at least one file, respectively, is to be processed by said function, said function comprising a local input/output function.

19. A method according to claim 2, further comprising steps of:
determining a failure occurring in said device; and
handling said failure occurring in said device with fault handling means in said second subsystem.

20. A method according to claim 19, further comprising steps of:
providing a fault handling server in said first subsystem;
determining a failure in said device; and
instructing, by said fault handling server, said fault handling means to terminate operations of said device.

* * * * *